United States Patent [19]

Toma

[11] 4,298,110
[45] Nov. 3, 1981

[54] TWO-SPEED CLUTCH WITH NEUTRAL
[75] Inventor: John W. Toma, Louisville, Ky.
[73] Assignee: General Electric Company, Louisville, Ky.
[21] Appl. No.: 110,170
[22] Filed: Jan. 7, 1980
[51] Int. Cl.³ .................... F16D 43/18; F16D 43/30; F16D 21/08
[52] U.S. Cl. .................... 192/48.4; 192/26; 192/48.7; 192/105 CD; 192/114 R
[58] Field of Search .................... 192/26, 48.4, 48.7, 192/103 B, 104 C, 105 CD, 114 R

[56] References Cited

U.S. PATENT DOCUMENTS

| | | | |
|---|---|---|---|
| 2,869,699 | 1/1959 | Bochan | 192/105 CD X |
| 3,092,230 | 6/1963 | Sisler | 192/105 CD |
| 3,131,797 | 5/1964 | Bochan | 192/105 CD X |
| 3,709,342 | 1/1973 | Spencer | 192/52 |
| 4,220,232 | 9/1980 | Fey et al. | 192/26 X |

*Primary Examiner*—Allan D. Herrmann
*Attorney, Agent, or Firm*—Radford M. Reams

[57] ABSTRACT

A two-speed clutch arrangement is disclosed in which an input shaft is drivingly connected to an output drum through a system of clutch shoes so as to alternatively produce direct drive of the output drum, a reduced speed drive, or a neutral condition in which drive is not transmitted to the output drum. The clutch system includes centrifugally actuated primary clutch shoes driven by the input shaft and establishing drive to an inner drum, and two different sets of friction clutches interposed between the inner drum and the output drum. The first set produces a slipping or low speed drive of the output drum, while the second direct drive set controllably establishes direct or high speed drive. Shifting of the clutch arrangement is carried out by a trigger actuator, which activates clutch trigger arrangements associated with the primary clutch shoes and the direct drive clutch set. The trigger actuator is shifted between alternate positions in which either centrifugal actuation of the primary clutch shoes or the direct drive clutch set is allowed. Shifting the position of the trigger actuator prior to establishment of drive to the input shaft being initiated creates a neutral condition of the clutch.

16 Claims, 3 Drawing Figures

TWO-SPEED CLUTCH WITH NEUTRAL

BACKGROUND DISCUSSION

This invention concerns multi-speed drive and more particularly a two-speed clutch drive in which drive is transmitted from an input member to an output member so as to drive the output member at either a high or low speed and in which a neutral condition of the clutch is also enabled with drive between the input member and output member interrupted. Such multi-speed drives are utilized in a variety of applications such as in clothes washing machines where an electric drive motor is utilized to drive the washing machine components. Commonly, a single drive motor is employed to cause oscillation of the washing machine agitator at relatively low rotative speeds, and during the spin cycle the same drive motor drives the basket at relatively high speed.

In addition, many washing machines employ differing agitator speeds for gentle or regular wash cycles to suit the washing action to various fabric types.

For such washing machine applications, a particularly advantageous drive arrangement is the use of a two-speed clutch in which the output rotation of the drive motor shaft is transmitted to the machine components with a two-speed clutch having a first mode in which the rotation of the input motor shaft is transmitted to an output member at the same rotative speed and in a second mode a controlled slip of the clutch produces a reduced speed of the output member relative to the rate of rotation of the drive motor.

This arrangement is described in U.S. Pat. No. 2,869,699, assigned to the assignee of the present application.

The two-speed drive depicted in this patent includes an inner drum constituting a rotary input member surrounding the motor shaft and concentric outer drum constituting a rotary output member which is adapted to drive the washing machine transmission input. In these applications, the motor is adapted to drive the washing machine drain pump by means of a shaft extension fitted with a coupling to the input shaft of the pump or pumps.

The arrangement described in that patent includes centrifugally actuated primary clutch shoes driven by the motor or input shaft which centrifugally expands the shoes upon rotation thereof to move into driving connection with an inner drum. The drive between the outer drum and the inner drum is controlled by two separate clutch set arrangements. The first clutch set includes clutch shoes which are spring biased into engagement with the inner drum and which are positively connected and driven by the outer drum, with centrifugal force acting on the shoes of the clutch tending to reduce the engagement force and create slippage, resulting in a low speed drive between the inner drum and the outer output drum and correspondingly between the input shaft and the output drum.

The second clutch set establishes a drive and is provided by a direct drive clutch carried on a carrier plate which is rotatably mounted on the motor input shaft. Upon rotation of the carrier plate by frictional drive of the carrier bearing assembly arrangement, the clutch shoes are urged by centrifugal force into driving engagement with both the inner and outer drums thereby establishing direct drive.

Control between high and low speeds is achieved by a solenoid actuator restraining or freeing the carrier plate for rotation, thus either allowing the direct drive to be activated or preventing its activation by prevention of rotation of the carrier plate.

U.S. Pat. No. 2,869,344 shows another variation of this approach in which centrifugal clutching action is staged in operation to provide a two-speed friction drive.

Copending application Ser. No. 072,273, filed Sept. 4, 1979 discloses an improvement for this clutch design in which the intermediate direct drive clutch components are carried by the inner and outer drums respectively to eliminate the need for the carrier plate and to produce other improvements as described in detail in that application.

This elimination of the carrier plate significantly reduces the cost of the unit.

In these clutching arrangements, there is not provided a neutral condition of the clutch which can be a disadvantage in some washing machine configurations.

As noted, the same motor is often utilized to drive a pump which empties the basket or tub water from a washing machine after each wash and rinse cycle. It is often advantageous for a pump down of the basket to be carried out prior to establishing drive to the basket in order to improve various wash performance characteristics, water entrainment, sudsing, etc.

Since the same motor drives the drain pump, this requires either a delay in the initiation of the clutching action due to mechanical or electronic delay means, or advantageously this could be achieved by the provision of a neutral mode of the clutch, in which the drive shaft is rotated but no drive transmitted to the output drum.

It is of course of great advantage in such applications that any controls for such clutching arrangement be simple and reliable, i.e., to be composed of a minimum number of parts and to involve only simple movements of the control mechanism.

Accordingly, it is an object of the present invention to provide a two-speed drive clutch of the general type described in which there is provided a neutral condition of the clutch in which the input shaft rotation is not transmitted to the output rotary drum in one mode of operation of the clutch unit.

It is another object of the present invention to provide such two-speed clutch with neutral having the control arrangement of extreme simplicity and reliability requiring a minimum number of additional parts, such feature being incorporated in two-speed clutch unit at minimal cost and will operate with excellent operating characteristics.

It is yet another object of the present invention to provide such two-speed clutch which does not require an intermediate carrier plate, but is readily controllable to either establish slow or direct drive from the inner drum to the outer drum.

SUMMARY OF THE INVENTION

These and other objects of the present invention, which will become apparent upon a reading of the following specification and claims, are achieved by a two-speed drive clutch including input means comprising a shaft having a coupling element extending through the clutch unit and adapted to drive an auxiliary load such as a washing machine drain pump. The clutch arrangement includes primary clutch shoes which are centrifugally actuated by being driven by the clutch input shaft to move outwardly into frictional engagement with the inside surface of an inner drum.

The inner drum in turn is drivingly connected with the outer or output drum, adapted to drive the washing machine transmission as in the above-cited patents, by either a slip clutch or a direct drive clutch.

The slip clutch unit is of the same type as described in the above-cited patent, and includes clutch shoes which are spring biased into frictional engagement with the inner drum and which include outer portions thereof slidingly received in openings in the outer drum such as to establish drive therebetween. The centrifugal force acting on the clutch shoes tends to reduce the frictional engagement therebetween to thus provide the reduced slip speed drive between the inner and outer drum, and accordingly between the input shaft and the outer drum.

The direct drive clutch includes a pair of direct drive clutch shoes mounted to either the inner or outer drum, but which are disclosed as being pivotally mounted to the outer drum such that upon rotation of the outer drum, the shoes are pivoted into engagement with the inner drum to establish a direct drive between the inner and outer drums and accordingly between the input shaft and the outer drum.

Control over the establishment of either low or high speed drives is achieved by means of a direct drive clutch trigger and trigger actuator. The trigger includes a pair of pivotally mounted trigger elements which move into and out of engagement with a trailing portion of the direct drive clutch shoes, either preventing or enabling the centrifugal actuation thereof in order to prevent or allow the high speed direct drive to be established through the clutch unit.

Similarly, a pair of primary clutch trigger elements are utilized to control the establishment of a neutral condition of the primary clutch unit, which trigger elements pivot into restraining positions preventing the centrifugal spreading of the primary clutch shoes and in a second position to allow the outward movement of the primary shoes and establish drive through the unit.

A single trigger actuator is employed which is movable between a first position in which it will strike tail portions of the primary clutch trigger elements to establish drive through the unit by moving the primary clutch shoe triggers from their locking to releasing positions and in a second position of the trigger actuator the trigger actuator is caused to move into contact with tail portions of the direct drive clutch trigger elements to release the trigger elements and enable direct drive to be established.

Cycling between neutral, high and low speeds is controlled by a simple positioning by a solenoid and spring between first and second positions of the actuator. The three-mode control is provided by the timing of the movement of the actuator element from its first to its second position in its relationship to the initiation of drive to the input shaft.

If the trigger actuator is allowed to remain in its first position by a spring biasing of the actuator element to its first position, the primary clutch triggers are contacted and drive is established to the unit in a low speed drive, since the direct drive clutch is not activated. Upon movement of the trigger actuator to the second position, the direct drive triggers are contacted during rotation of the outer drum and direct drive is established.

The third or neutral mode is established by movement of the actuator from the first to second positions prior to initiation of drive. The primary shoe triggers are left in their first or locking positions and neutral drive is established.

Accordingly, positioning of the trigger actuator in two positions can establish three different modes through the clutch unit by the timing relative to the start of drive.

DETAILED DESCRIPTION

Figure 1:
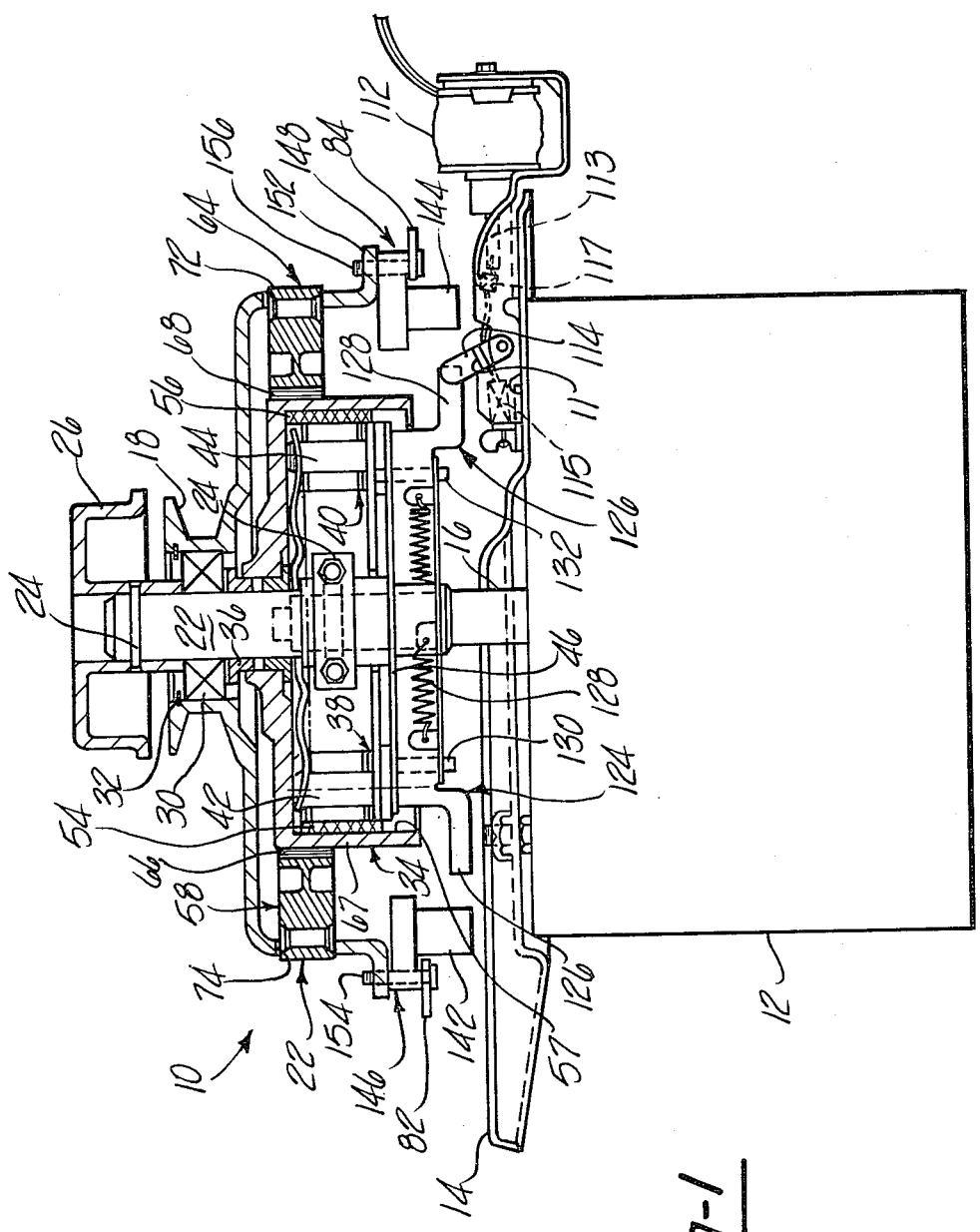
FIG. 1 is a partially sectional longitudinal view of a clutch and motor assembly incorporating the clutch and drive unit according to the present invention, the representation being somewhat schematic in form and with some components omitted for purposes of illustration.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the clutch unit 10 according to the present invention is shown assembled with a drive motor 12, with the entire assembly being adapted to be mounted within the washing machine by means of a mounting bracket 14 secured to the endface of the drive motor 12. The drive motor output shaft 16 is adapted to drive through the clutch unit 10 to an output pulley sheave 18, which in turn receives a belt drive connected to the washing machine transmission (not shown).

The output shaft 16 is also coupled to a shaft extension 22 by means of a coupling 24, and in turn the shaft extension 22 is pinned by pin 25 to a pump coupling member 26 which is adapted to receive a flexible coupling connected to the input shaft of the drain pump (not shown).

Thus, the drive motor 12 has two different drive outputs, one the output through the clutch unit 10 and the other directly driven by the output shaft 16 and shaft extension 22, i.e., the pump coupling member 26.

According to one of the concepts of the present invention, the clutch unit 10 is provided with a neutral condition such that the drive motor 12 can be employed to drive the shaft extension 22 and pump coupling member 26 without producing a drive input to the output pulley sheave 18 in order that the drain pump can be operated without driving the washing machine transmission.

The general arrangement of the clutch unit 10 includes an outer drum 28 integral with the output pulley sheave 18 and rotatably supported by the bearing 30 on the shaft extension 22, suitable snap retainer 32 retaining the outer drum 28 thereon.

Also provided is an intermediate inner drum 34 rotatably supported on a bearing 36 on the shaft extension 22.

The clutching unit 10 includes a primary clutching means interposed between the rotary input means, comprised of the output shaft 16 and shaft extension 22, and the inner drum 34. Slip clutch means are interposed between the inner drum 34 and the outer drum 28, as well as direct drive clutch means also interposed between the inner drum 34 and outer drum 28.

The primary clutch means comprises a centrifugal clutch which establishes a drive from the rotary input means to the inner drum 34 upon rotation above a predetermined rate or rotation. The centrifugal clutch is comprised of a pair of clutch shoes 38 and 40 which are pivoted to plate 46 secured to the output shaft 16 by a sleeve member 48, in turn secured to the output shaft 16 to thus produce rotation of each of the clutch shoes 38 and 40 with rotation of the rotary input means.

Tension springs 50 and 52 are provided which bias the clutch shoes 38 and 40 inwardly and counteracting the effect of centrifugal force such that engagement of friction surface shoes 54 and 56 of clutch shoes 38 and 40 respectively is precluded until a predetermined rotation of the rate of the output shaft 16 is achieved.

Upon rotation of the clutch shoes 38 and 40 at said predetermined rate of rotation, clutch shoes 38 and 40 move radially outward such that the friction surface shoes 54 and 56 engage the inner surface 57 of the inner drum 34 as depicted in FIG. 1. Whenever the clutch shoes 38 and 40 are not being rotated at or above the predetermined rate of rotation, the shoes are pivoted inwardly as depicted in FIG. 2 to be moved out of engagement with the inner drum 34 such as to disestablish drive between the output shaft 16 and the inner drum 34.

As will hereinafter be described in detail, a triggering mechanism is employed to control this movement of the clutch shoes 38 and 40 under the influence of centrifugal force in order to provide a neutral condition.

Figure 3:
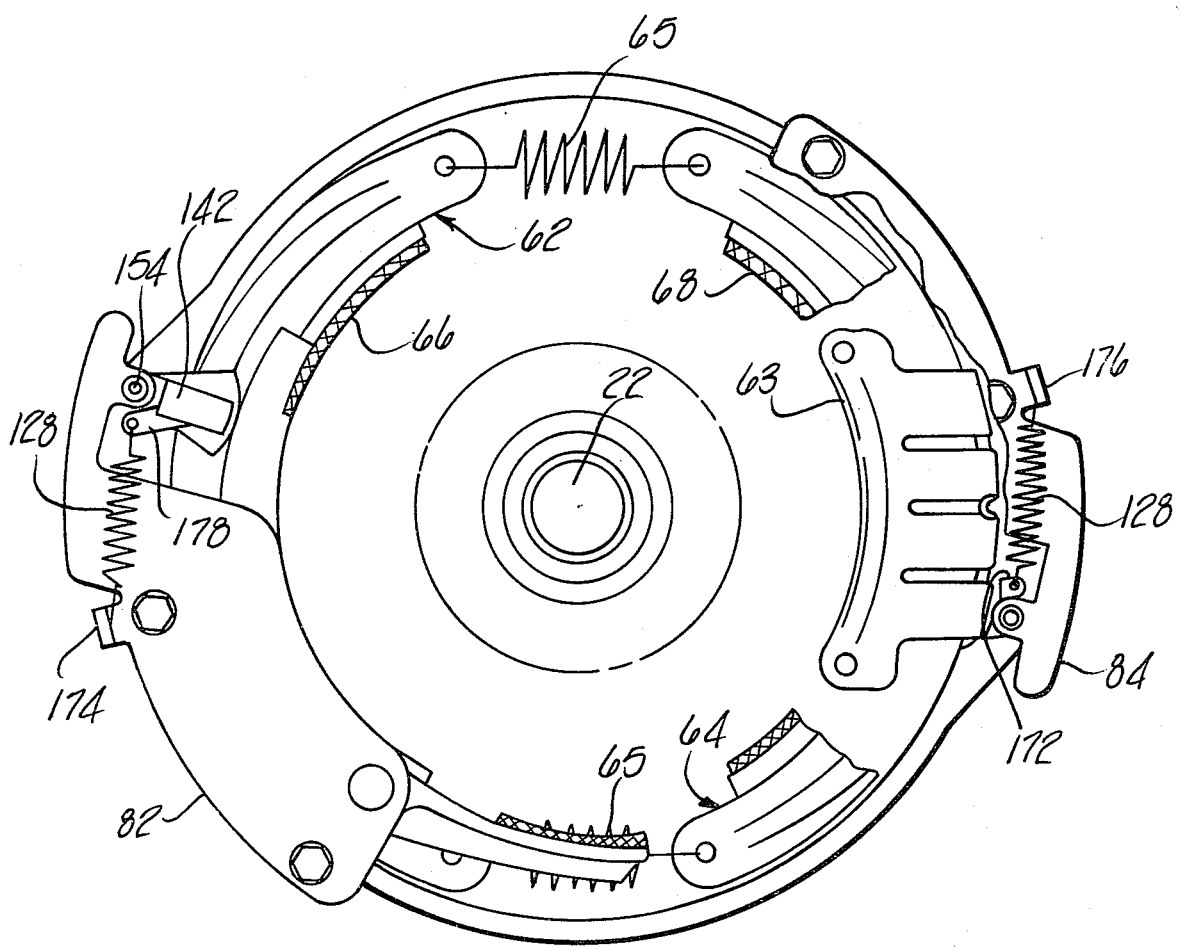
FIG. 3 is an endless view looking up of the clutch assembly shown in FIG. 1 with certain components broken away to reveal interior details.

The slip clutch arrangement 58 is of the type described in aforementiond U.S. Pat. No. 2,869,699 and aforementioned application Ser. No. 072,273, filed Sept. 4, 1979. This includes a pair of clutch shoes 62 and 64 which have arcuate friction surfaces 66 and 68, respectively, which are urged into engagement with the outside surface 67 of the inner drum 34 by means of operator springs 65 (FIG. 3). The clutch shoes 62 and 64 (FIG. 1) also include portions 70 and 72, respectively, which pass through slotted openings 74 and 76 in the outer drum 28 such as to be positively driven thereby. Clutch shoes 62 and 64 are engaged with spring plates 63 (FIG. 3) to preclude vibration thereof. This arrangement allows a centrifugally induced outward movement of each of the clutch shoes 62 and 64 so as to reduce the frictional driving connection between the inner drum 34 and the outer drum 28 and thus produce a slipping, reduced speed drive relative to the drive motor speeds in the same manner as described in the aforementioned U.S. Patent and patent application.

Figure 2:
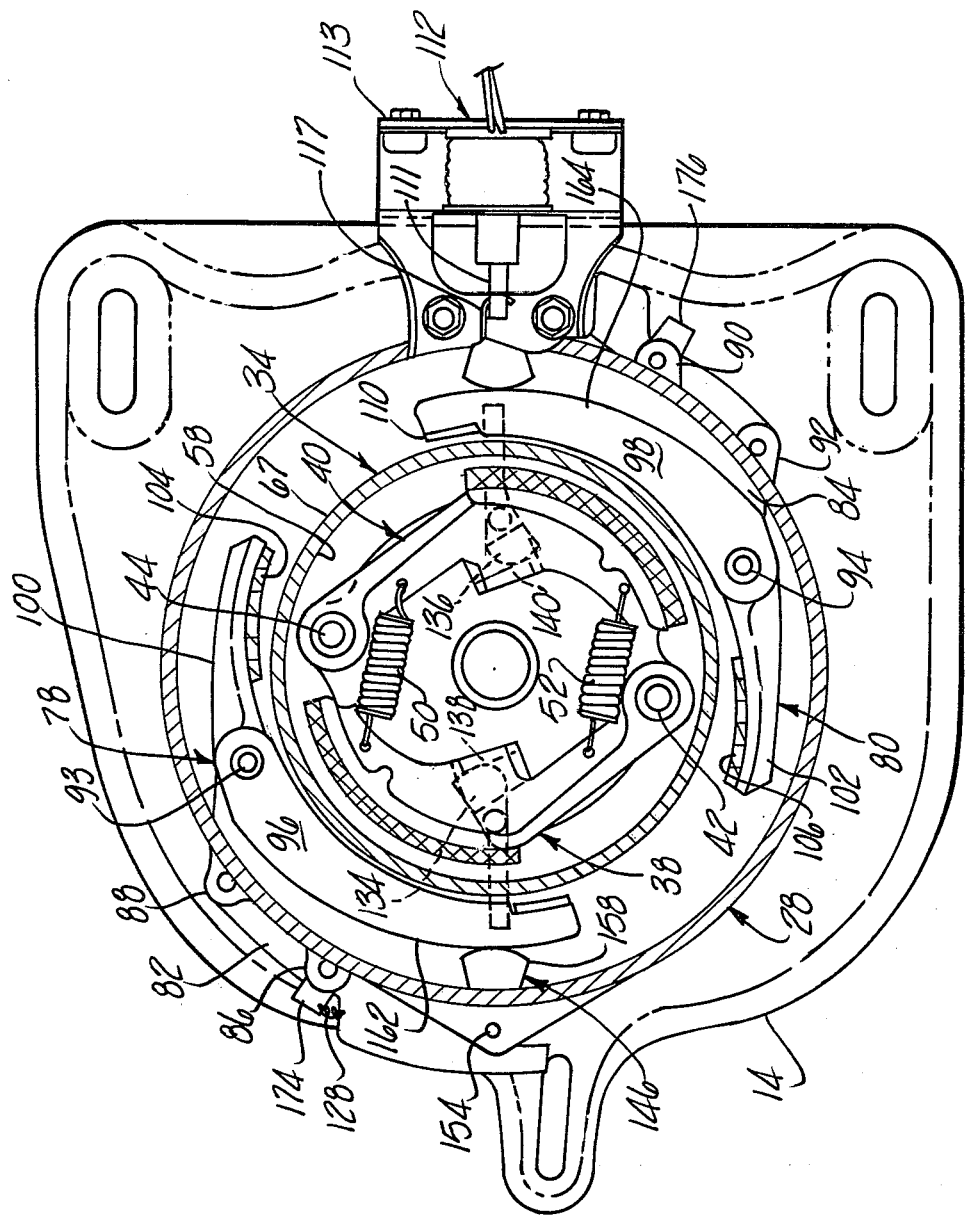
FIG. 2 is a sectional view of the clutch assembly shown in FIG. 1 taken along the line 2—2.

The high speed or direct drive clutch arrangement 60 includes a pair of centrifugally actuated clutch shoes 78 and 80 (FIG. 2) which are mounted to the outer drum 28 by brackets 82 and 84 (FIG. 3) affixed to the outer drum 28 by means of integral mounting eyes 86 and 88, 90 and 92 (FIG. 2). Each of the clutch shoes 78 and 80 is mounted for rotation about pivot points 93 and 94, and have relatively large mass trailing portions 96 and 98 such as to have a greater mass on one side of the pivot points 93 and 94 than on the other side.

The leading side of each clutch shoe 78 and 80 includes a clutching arm portion 100 and 102, provided with arcuate friction shoes 104 and 106 which are adapted to be rotated into engagement with the outside surface 67 of the inner drum 34 upon rotation thereof by the effect of the greater mass of the trailing portions 96 and 98 creating an unbalance about the respective pivot points, causing the clutch shoes 78 and 80 to rotate and move the arcuate friction shoes 104 and 106 into tight engagement therewith. This produces a direct one-to-one drive ratio between the inner drum 34 and outer drum 28 and thus establishes a direct drive from the input shaft means to the output pulley sheave 18.

The trailing portions 96 and 98 are each also provided with bumper friction material 108 and 110, respectively, in order to cushion impacting of the shoes on the outside surface 67 in the event of slight vibrations, tending to produce an oscillation of the shoes into engagement therewith.

In similar fashion to the primary clutch, the action of the direct drive clutch arrangement 60 is controlled by trigger means which operates jointly with a common solenoid actuator associated with the primary clutch means.

The trigger means includes a solenoid actuator 112 mounted by means of a bracket 113 welded to the mounting bracket 14. Solenoid actuator 112 has a plunger 111 controlling the position of the actuator element 114. When the solenoid actuator 112 is not energized, the actuator element 114 is biased by a spring 115 which remains in position as shown in FIG. 1 positioned against the top 116. With the solenoid actuator 112 energized, the actuator element 114 is moved to a second position against the stop 118, a resilient lost motion connection between the plunger 111 and the actuator element 114 being provided by a spring 117.

In the first-mentioned position, the actuator element 114 lies in the path of tail portions 120 and 122 associated with trigger elements 124 and 126, respectively, since these are located at the same radial distance outward from the clutch axis. This causes contact therebetween as the primary shoes 38 and 40 are rotated.

Trigger elements 124 and 126 interact with the primary clutch shoes 38 and 40 such as to either lock the clutch shoes 38 and 40 in a disengaged position or to release them to allow the centrifugal actuation thereof to occur.

Each of the trigger elements 124 and 126 are spring-biased by tension springs 128 to be swung about pivotal mounts 130 and 132 so as to be moved to the releasing position. In the releasing position, locking portions 134 and 136 of trigger elements 124 and 126 are clear of catch plates 138 and 140, respectively, which are integral with the respective primary clutch shoes 38 and 40.

In the locking position, the trigger locking portions 134 and 136 are cammed into locking engagement with the respective catch plates 138 and 140, which prevent the respective primary clutch shoes 38 and 40 from rotating outwardly in response to the terminal force and thus maintain a neutral condition of the clutch unit 10.

If the actuator element 114 is in the first position shown in FIG. 1 when the drive motor 12 is energized, tail portions 120 and 122 are contacted thereby to be pivoted about the pivotal mounts 130 and 132 to the releasing position with the clutch thus allowed to move outwardly and establish drive between the inner drum 34 and the input shaft 16.

In the second position, the actuator element 114 is positioned in the path of the tail portions 142 and 144 associated with respective direct drive clutch triggers 146 and 148 as the outer drum 28 rotates, which are pivotally mounted on respective mounting pins 154 and 156 mounted to bores formed in flanges 150 and 152 and also to sections of the brackets 82 and 84.

Each of the direct drive clutch triggers 146 and 148 includes a locking portion 158 and 160 which coacts when rotated with the respective trailing portions 96 and 98 of the direct drive clutch shoes 78 and 80, moving into with the respective outer surfaces 162 and 164 thereof. The direct drive clutch triggers are urged into the locking position by means of tension springs 166 and 168, respectively. Tension spring 166 is connected at one end to a tab portion 178 integral with tail portion 170 of trigger 146 and at the other end to tab portion 174 formed on plate 82. Similarly, tension spring 168 is connected at one end to tab portion 172 of trigger 148 and at its other end to tab 176 formed on bracket 84.

Thus, the locking portions 158 and 160 tend to wedge into the intervening space between the outer surfaces 162 and 164 of the trailing portions 96 and 98, respectively, and the interior of the outer drum 28 to preclude centrifugal actuation of the respective direct drive clutch shoes 78 and 80 into engagement with the inner drum 34.

Upon the actuator element 114 moving into the path of the tail portions 142 and 144, respectively, however, the locking portions 158 and 160 are rotated over center out of engagement therewith and enable the centrifugal force exerted by the trailing portions 96 and 98 to hold the locking portions 158 and 160 in this position.

In this mode, the drive is established by the engagement of the direct drive clutch shoes 78 and 80.

It can be understood from the above that three different modes of operation are enabled by the two conditions of the solenoid actuator 112 as described above when the solenoid is energized, the actuator element moving from the first position to the second position. Whenever the solenoid actuator 112 is deenergized, the spring bias causes the actuator element 114 to again move to the first position shown in FIG. 1.

If the solenoid actuator 112 is deenergized at the time of the start up of the drive motor 12, the actuator element 114, being in the first position, contacts the tail portions 120 and 122 of the respective trigger elements 124 and 126 causing release of the primary clutch shoes 38 and 40 with centrifugal actuation thereof enabled such as to establish drive between the output shaft 16 and the inner drum 34.

If the solenoid 112 continues in a deenergized state, the direct drive clutch triggers 146 and 148 remain in locking engagement with the trailing portions 96 and 98 of the direct drive clutch shoes 78 and 80 and accordingly drive from the inner drum 34 to the outer drum 28 is via the clutch shoes 62 and 64. This thereby establishes low speed drive from the output shaft 16 to the outer drum 28 and output pulley sheave 18.

If the solenoid 112 is energized at this point, the actuator element 114 moves from the first position to the second position and into the path of the tail portions 142 and 144 causing the direct clutch triggers 146 and 148 corresponding thereto be rotated out of the locking position. This enables the direct drive clutch shoes 78 and 80 to be engaged with the inner drum 34 and establish direct or high speed drive through the unit.

In order to establish neutral, the solenoid actuator 112 is energized prior to the start up of the drive motor 12 and the actuator element 114 is caused to move from the first position to the second position. This allows the trigger elements 124 and 126 to remain in the locking position after the drive motor 12 is energized, precluding the establishment of drive through the primary clutch means from the output shaft to the inner drum 34 and accordingly a neutral condition of the clutch unit is produced.

Therefore, a simple two-position solenoid actuation enables neutral, high and low speed drive modes.

It will be appreciated that the trigger and actuator arrangements are simple and rugged in construction, such as to be enabled to be manufactured at relatively low cost while operating in a highly reliable manner suitable for such applications as washing machine drive units.

It will also be seen that the provision of the high speed direct drive clutch shoes mounted to the drum eliminates the need for a separate carrier plate as required in the design described in U.S. Pat. No. 2,869,699, thereby simplifying the drive unit and reducing the number of clutch sets to a minimum.

The embodiments of the invention in which an exclusive property or privilege is claimed are defined as follows:

1. A two-speed clutching arrangement producing a driving connection between a rotary input means and a rotary output means in a plurality of drive modes, including a first mode in which said rotary output means is driven at the same rotative speed as said rotary input means; a second mode in which said rotary output means is driven by said rotary input means at a reduced speed, said clutching arrangement comprising:

a rotatably supported inner drum;
means producing a driving connection between said rotary input means and said inner drum;
an outer drum mounted over said inner drum, said outer drum comprising said rotary output means;
slip clutch means interconnecting said inner drum and said outer drum, said slip clutch means including means establishing a driving connection between said inner drum and said outer drum producing a lesser rate of rotation of said outer drum than said inner drum to thereby produce said reduced drive between said rotary input means and said outer drum;
direct drive clutch means interconnecting said inner drum and said outer drum, said direct drive clutch means including at least one clutch shoe and means mounting said at least one clutch shoe to one of either said inner drum or outer drum at one end thereof to be centrifugally moved by rotation of said one of said inner drum or outer drum to produce a driving engagement with the other of said inner drum or outer drum, whereby centrifugal engagement of said at least one clutch shoe produces a direct drive connection between said inner drum and said outer drum.

2. The two-speed clutching arrangement according to claim 1 wherein said direct cluch means includes a pair of clutch shoes pivotally mounted to said one of said inner drum or said outer drum each having a friction surface movable about said pivotal mount by centrifugal force into said driving engagement.

3. The two-speed clutching arrangement according to claim 2 further including trigger means operable to block each of said pivotally mounted clutch shoes from movement to thereby prevent establishment of said direct drive connection between said inner drum and said outer drum.

4. The two-speed clutching arrangement according to claim 3 wherein said trigger means comprises a pair of pivotally mounted respective trigger elements and each trigger element including a portion thereof movable into position engaging a respective pivotally mounted clutch shoe to lock said clutch shoe against said engagement movement.

5. The two-speed clutching arrangement according to claim 4 including trigger actuator means and wherein each of said trigger elements includes a tail portion located at the same radial distance on either side of said clutch arrangement axis; and wherein said trigger actuator means includes an actuator element and further including means moving said actuator element into position to contact said trigger element tail portion thereof upon rotation of said inner and outer drums.

6. The two-speed clutching arrangement according to claim 5 wherein each of said direct drive clutch means pivotally mounted clutch shoes comprises a trailing portion and a leading portion thereof located on either side of said pivotal mounting thereof, said trailing portions having more mass than said leading portions, whereby centrifugal forces acting on said trailing portions cause pivotal movement thereof, moving said leading portions into engagement with said other of said inner or outer drum and wherein each of said trigger means includes a portion rotating into engagement with said trailing portions.

7. The two-speed clutching arrangement according to claim 6 further including spring bias means urging said trigger element into said position in engagement with said respective trailing portions of said pivotally mounted clutch shoes.

8. The two-speed clutching arrangement according to claim 1 wherein said direct drive clutch shoes are pivotally mounted to said outer drum, and wherein pivoting motion of each of said clutch shoes moves said clutch shoes into engagement with said outer drum.

9. The two-speed clutching arrangement according to claim 2 wherein said means establishing said driving connection between said rotary input means and said inner drum comprises centrifugally activated primary clutching means producing a driving connection between said rotary input means and said inner drum upon rotation of said rotary input means at a predetermined rate of rotation.

10. The two-speed clutching arrangement according to claim 9 further including trigger means associated with said primary clutch means, wherein said trigger means further includes lockout means preventing centrifugal activation of said primary clutching means, whereby said clutching arrangement is provided with a neutral condition upon said trigger means preventing said centrifugal activation of said primary clutching means.

11. The two-speed clutching arrangement according to claim 9 wherein said primary clutching means comprises a pair of pivotally mounted primary clutch shoes mounted within said inner drum and movable outwardly into engagement with the interior of said inner drum to establish said driving connection and wherein said trigger means comprises means engaging each of said primary clutch means preventing said outward movement of said primary clutch shoes.

12. The two-speed clutching arrangement according to claim 11 wherein said trigger means associated with said primary clutch shoes includes a pair of primary clutch triggers pivotally mounted to be movable into engagement with a respective primary clutch shoe, locking said clutch shoe against said outward movement.

13. The two-speed clutching arrangement according to claim 12 wherein each of said primary clutch triggers includes tail portions thereof positioned at common radial distances from said clutching arrangement axis.

14. The two-speed clutching arrangement according to claim 13 wherein said actuator element is movable into position to contact said direct drive clutch trigger tail portions and also movable shiftable from said position into a second position whereat said actuator element is in the path of said primary shoe trigger tail portions upon rotation of said input means, whereby a neutral condition of said clutching arrangement is provided by operation of said actuator means to selectively move said actuator trigger element to said second position prior to rotation of said rotary input means.

15. The two-speed clutching arrangement according to claim 14 wherein said actuator element is pivotally mounted and said actuator means further includes a solenoid positioning said actuator trigger element in said second position about said pivotal mount upon energization thereof.

16. The two-speed clutching arrangement according to claim 12 wherein said rotary input means further includes an input shaft extension extending through said inner drum; and a second output means connected thereto, whereby in said neutral condition of said clutch, said second output means is rotated, while said outer drum is not rotated by said rotary input means.

* * * * *